United States Patent [19]

Moore

[11] Patent Number: 4,797,815

[45] Date of Patent: Jan. 10, 1989

[54] INTERLEAVED SYNCHRONOUS BUS ACCESS PROTOCOL FOR A SHARED MEMORY MULTI-PROCESSOR SYSTEM

[75] Inventor: Wayne T. Moore, Safety Harbor, Fla.

[73] Assignee: Paradyne Corporation, Largo, Fla.

[21] Appl. No.: 800,995

[22] Filed: Nov. 22, 1985

[51] Int. Cl.⁴ ............................................. G06F 13/14
[52] U.S. Cl. ..................................................... 364/200
[58] Field of Search ... 364/200 MS File, 900 MS File

[56] References Cited

U.S. PATENT DOCUMENTS

| | | | |
|---|---|---|---|
| 3,997,896 | 12/1976 | Cassarino, Jr. et al. | 364/200 |
| 4,181,974 | 1/1980 | Lemay | 364/200 |
| 4,669,056 | 5/1987 | Waldecker et al. | 364/900 |

*Primary Examiner*—Eddie P. Chan

*Attorney, Agent, or Firm*—Kane, Dalsimer, Sullivan, Kurucz, Levy, Eisele, and Richard

[57] ABSTRACT

A system for sharing several memory modules by several processors on a common bus uses a protocol in which, after a processor gains access to a memory module read or write data is transferred on the bus within a preset number of system clock periods. After priority is established by polling, the processor sends memory address on the common bus. For each operation several idle system clock periods are provided before data is returned from the memory to permit the memory to retrieve the data. Meanwhile, the protocol interleaves requests for access to other memory modules from other processors thereby increasing the throughput of the system.

1 Claim, 8 Drawing Sheets

INTERLEAVED SYNCHRONOUS BUS ACCESS PROTOCOL FOR A SHARED MEMORY MULTI-PROCESSOR SYSTEM

BACKGROUND OF THE INVENTION

1. Field of Invention

This invention pertains to a protocol and a system for accessing one or more common memories over a common bus, and more particularly, to a common memory sharing system having a plurality of data processors, such as the type wherein each processor being provided to exchange data with an external computer or other data processing equipment.

2. Description of the Prior Art

It is frequently desirable for several data processors to exchange information through a common memory. (In this application the term "data processors" or "processors" refers to single chip microprocessors such as the common Z8000, or other similar devices) so that each can run in an asynchronous mode, i.e. independently of the others. For example, a high speed main frame computer may be tied to its peripherals and/or other main frame computer through a multi-processor system with separate processors being dedicated to the main frame or one of the peripherals. These processors enable data exchange between the various devices even though each may have its own coding scheme, and timing or protocol requirements. The microprocessors can be tied together through a set of common memories. However, most prior art configurations were rather slow because each program had to request access to one of the memories through a single memory control system, and then wait for an indetermined period until actual access for either a data reading or data writing operation was allowed.

OBJECTIVES OF THE PRESENT INVENTION

In view of the above, a principal objective of the present invention is to provide a system with a protocol in which any processor is allowed access to a selected memory after a preset time frame, so that the processor can perform other tasks after it has completed its access request. Another objective is to provide a system with a protocol which does not require complicated polling schemes or centralized priority arbitration circuits to determine the relative priorities between several processors requesting simultaneous access to the separate memories.

Another objective is to provide a system with a protocol which allows rapid simultaneous access to several memories over a single bus.

Yet another objective is to provide a system which is flexible so that the number of processors and memories can be expanded without extensive modifications.

Other objectives and advantages of the system shall become apparent from the following description of the invention.

SUMMARY OF THE INVENTION

In accordance with the present invention a multiprocessor shared memory system comprises a plurality of processors tied to a common bus by corresponding bus interface circuits, and a plurality of common memories tied to the common bus.

The common bus represents the physical path by which each processor communicates with any other processor in the same system. One or more high-speed common memories form an integral part of the multi-processor communication scheme and no data may be passed directly from one processor to another, but must be temporarily stored in common memory between transfers.

The protocol for the system is defined as the interaction between processors, each of which are capable of initiating bus cycles, and the common memory modules, which respond to most of the bus cycles. To obviate the need for extensive use of software polling to synchronize control between processors, an interprocessor interrupt means is also defined.

The common bus interface includes circuitry to generate and check parity on transfers of both address and data, and a means to allow the common memory to interrupt any processor experiencing a double-bit error during a common memory access.

In order to achieve a high aggregate throughput rate for the common bus a means of overlapping the memory cycles is defined. This technique, commonly termed interleaving, results in a reduced average effective memory cycle time over a non-interleaved approach without requiring faster access memory components. In order to implement interleaved memory cycles on the common bus, a synchronous timing scheme is used. This defines a convention of timing states controlling the proper sequencing of overlapped memory cycles.

When two or more processors request the same memory module simultaneously, a priority phase or clock period is used to determine which requesting processor has priority. If however, two processors request two different memory modules (within the same clock period) both will be allowed to access the targeted memory modules with overlapping cycles. In order to prevent an in-phase collision on the bus, the priority clock period determines which processor is allowed to start a memory cycle first. As shall be described in more detail below, the system has been designed with four memory modules and sixteen processes, however these numbers are not critical. With four memory modules and four or more processors demanding the common bus, the possibilities for interleaving are such that for any given clock cycle up to four processors may each have an active memory cycle present on the common bus. Thus, any 2, 3, or 4 processors which are making block transfers out of separate memory modules will have greatly reduced contention compared to a single memory resource, without the need for a multi-ported memory system.

Implementation of an interleaved common bus requires a system clock for synchronous operation. The system clock has no relationship to the local oscillators for each processor in the system. Therefore each processor runs asynchronously with respect to the common bus and only its bus interface circuit requires synchronization to the system clock.

The common bus consists of two information-handling bi-directional buses. The first of these is the priority and read data bus. This is a multiplexed bus that carries priority polling information during one clock period of a common bus cycle, and read data during another period if the operation is a READ from memory. This bus also has an additional function during interprocessor interrupt periods that is described below. The second bus is the memory address and write data bus. This is also a multiplexed bus that carries memory addressing information during one clock period of a common bus cycle, and carries write data during another period if the operation is a WRITE to memory.

When a processor performs an operation that requires access to the common memory, the common bus interface, if conditions permit, asserts a request signal for the appropriate memory module. Together with the request, a priority bit will be placed on the read data bus in the bit position corresponding to the user number of the processor module.

If any other processors are requesting a bus cycle priority is determined in the first clock period. Those processors which lose the priority poll will maintain their request on the bus until they are serviced or reset in some manner. As part of the priority period, the processor acquiring priority must drive the memory module busy signal to select the addressed module and in the same clock period place a function code on the bus indicating to the selected memory module the operation to be performed. Once selected at the end of the priority polling period, the memory module assumes control of the module busy signal for all subsequent clock cycles of the data transfer.

If a processor module wins the priority poll, the next clock period will be an address period whereby the processor module places the memory address and an overall parity bit on the memory address/write data bus. Since another processor module may make a bus request during the address period, the winning processor module must remove his request, priority bit, and function code from the bus at the end of the polling period.

Beginning with the address phase, the common bus interface follows a strict sequence of states. If the operation is a write cycle, the interface places write data on the address/write data bus along with a complying parity bit during the next clock period. If the operation is not a write cycle then the address/write data bus is not driven during the write data period.

The next two clock periods are null periods to the processor's common bus interface. If the operation was a write cycle, then the last clock period is also be a null period. In the case that the operation requested by the processor module is a read operation, during the last period the common bus interface accepts 16 bits of data from the accessed memory module along with an overall parity bit generated by the memory module.

In summary, access to a memory module requires six consecutive clock periods as follows:
1. Request/priority poll
2. Address
3. Write data, (if write cycle)
4. Null state
5. Null state
6. Read data, (if read cycle)

REQUEST AND POLL CONDITIONS

In order to eliminate the possibility of lockout of a low priority processor by two or more higher priority processor modules, a condition is placed on the assertion of the memory module request signal. A processor module is not permitted to assert a memory module request if that memory module is being requested by another processor at the beginning of the clock period. This means that the only time that more than one processor will contend for the same memory module is when all requests for that module appear during the same clock period. Thus all outstanding requests for a memory module will be served in order of priority before any processor is permitted to assert another request for that memory module.

Two separate rules govern whether a processor that is requesting a memory module may take part in the priority poll. First, no processor may participate in a priority poll if the poll inhibit signal is asserted at the beginning of the clock cycle. This signal is present to prevent the conflicting usage of the multiplexed data buses and is generated by either a processor module during the memory address phase of a write memory operation or by a memory module during the read data phase of a read operation.

Second, if the memory module being requested by a processor module is busy during the clock period in which a priority poll is taking place, then the requesting processor will not participate in the poll. Obviously, this prevents the case where a higher priority processor requesting a busy memory wins the priority poll over a lower priority processor requesting an unbusy memory module, in which case both processors would wait for the busy memory module to become free.

INTERPROCESSOR INTERRUPTS

Each processor module has the capability to cause an interrupt on any processor in the system via the common bus. (With the Z8000 processor, this interrupt will manifest itself as a non-vectored, maskable interrupt.)

It is inevitable that two or more processors will attempt to transmit an interprocessor interrupt to the same processor within the span of time that the target processor is able to acknowledge the first arrival. To prevent loss of subsequent interrupts, a first-in, first-out (FIFO) queue is designed in the common bus interface. This FIFO is deep enough to store one interprocessor, non-vectored interrupt from each processor in the system. To prevent overflowing the FIFO, the operating system of each processor sending an inter-processor interrupt is not allowed more than one un-acknowledged interrupt to be sent to each processor module. Since there exists only one source for non-maskable interrupts and local reset commands, a FIFO is not required for these interprocessor interrupt types.

Interprocessor non-vectored interrupts may be performed by any processor by executing the appropriate output operation. The data contained in the 16-bit output will indicate which processor modules will be interrupted, for each "one" in the data word the processor in the slot corresponding to that bit position will receive a non-vectored interrupt.

All types of interrupts produce a bus cycle on the common bus similar to a common memory cycle described above. However, the bus interface instead assert an interrupt busy signal on the common bus rather than a memory busy at the end of a normal polling period. The interrupt busy signal alerts all processor modules that an interrupt cycle to a specified set of processors has begun. In addition, at the end of the polling period all processor modules temporarily latch the binary encoded slot number of the processor winning the poll along with the type of interrupt as indicated by the function code. In the case of interprocessor interrupts, each type of interrupt is represented by a separate bit in the 3-bit function code put on the bus by the interrupting processor module.

During the last phase of the interrupt cycle, in what is normally the read data phase of a memory cycle, the interrupting processor's bus interface drives the read data bus with the output instruction's data. Each bit on the read data bus that is set will cause an interrupt to occur on the processor module possessing a user number matching the position of that bit.

COMMON BUS PARITY

Parity bits may be added to the common bus address and data bits to insure the integrity and reliability of the system.

DETAILED DESCRIPTION OF THE INVENTION

Figure 1:
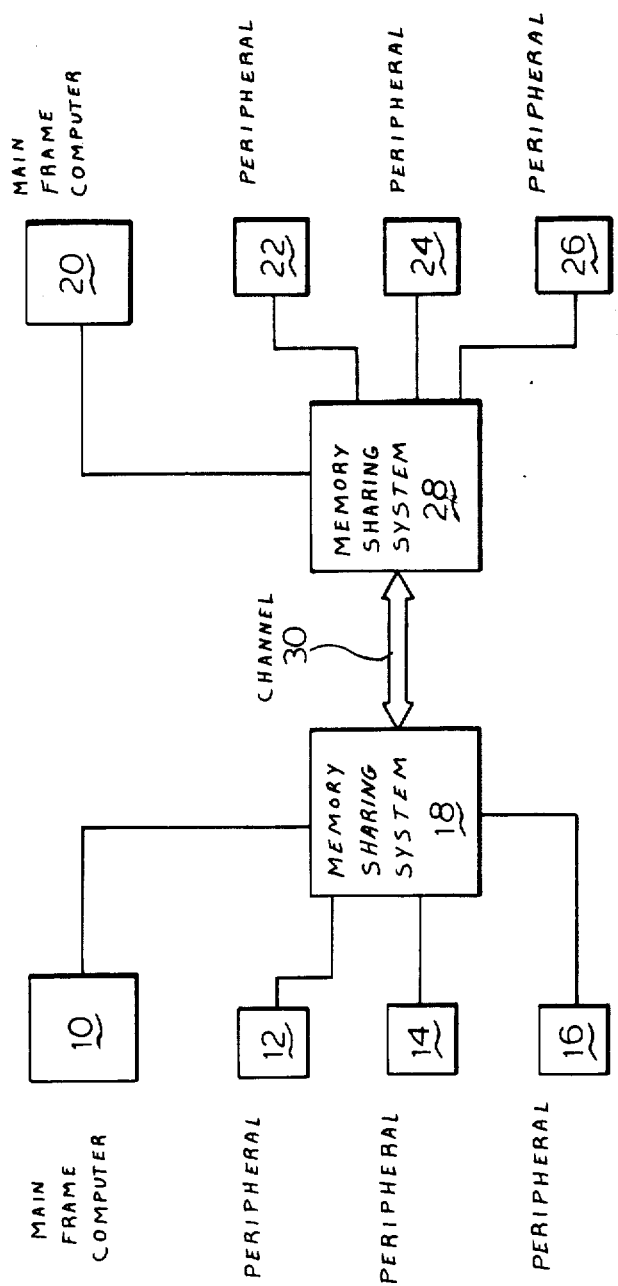
FIG. 1 shows schematically two main frame computers and peripherals interconnected by a multi-processor shared memory system in accordance with this invention.

Referring now to FIG. 1 which shows two main frame computers 10 and 20, each having peripherals 12, 14, 16 and 22, 24, 26 respectively. The main frame computers exchange information through the use of two memory sharing systems 18 and 28 respectively. In addition, information may be exchanged between the two memory sharing systems over a standard communication channel 30 so that any device of FIG. 1 is able to exchange information with any other device.

Figure 2:
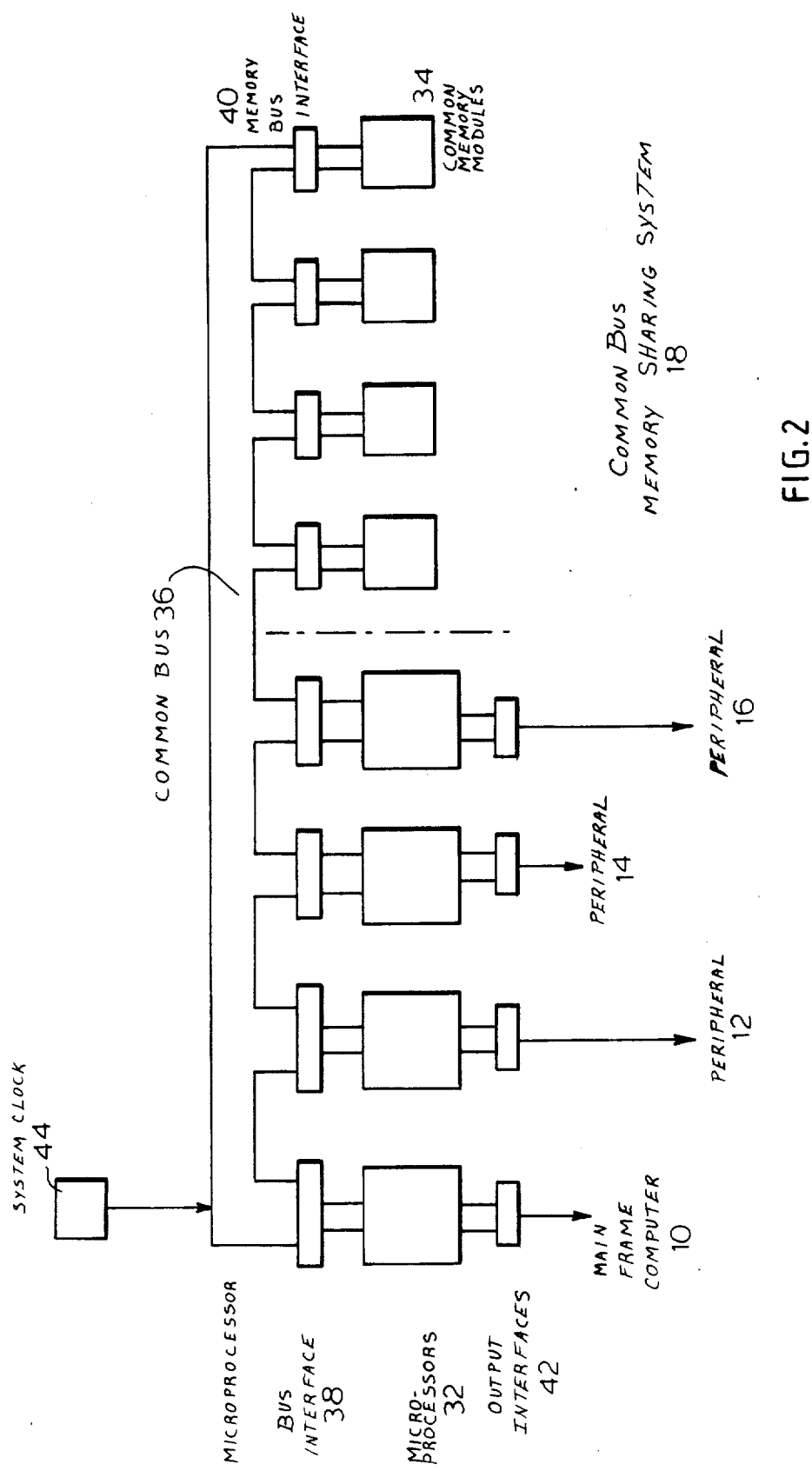
FIG. 2 shows a block diagram for the shared memory system of FIG. 1.

As shown in more detail in FIG. 2, a memory sharing system (such as system 18) comprises a plurality of microprocessors 32 and memory modules 34 tied to a common bus 36 by corresponding bus interfaces 38, 40. For example, for the configuration of FIG. 1 four microprocessors 32 are required. The number of memory modules 34 depends on the particular application. In FIG. 2 four modules are shown. The microprocessors may be provided with output interface circuits 42 for connecting the microprocessor to the corresponding main frame computer or peripheral if required.

A system clock 44 provides clocking signals for the common bus 36.

Figure 3:
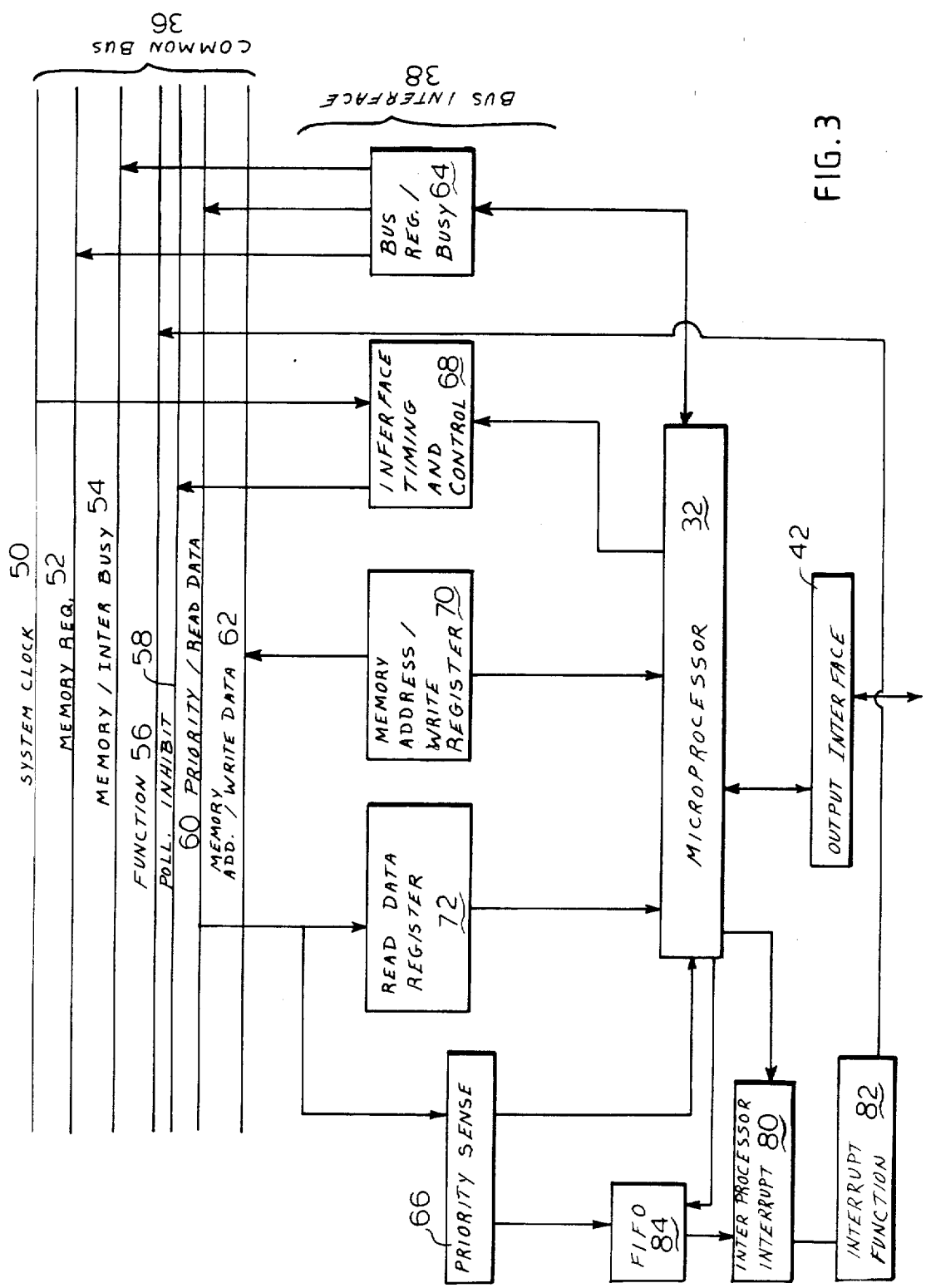
FIG. 3 shows details of the common bus and microprocessor bus interface for the shared memory system of FIG. 1.

A typical microprocessor 32 and its microprocessor bus interface, together with the common bus 36 are shown in FIG. 3. It should be understood that while in this Figure, bus 36 has been functionally partitioned into several control and/or data buses, it should be understood that each of these buses is capable of bi-directional transfer of several binary bits in parallel.

As shown in FIG. 3, the common bus 36 comprises a system clock bus 50, receiving clock signals from clock 44 (of FIG. 2). A group of preselected clock signal periods are used to initiate and complete each operation on the common bus. For example, for the number of processors and memory modules described above, six clock periods are required to provide access to a memory module, or an interprocessor interrupt.

The memory request bus 52 indicates when any one of the processors 32 requested access to a particular memory module 34. Bus 54 indicates when each memory module is busy. Bus 56 is the function bus while bus 58 is the poll inhibit bus. Bus 60 is the first multiplexed bus used for both the priority and read data signals.

Bus 62 is the second multiplexed bus used for both memory address and write data signals.

Figure 5:
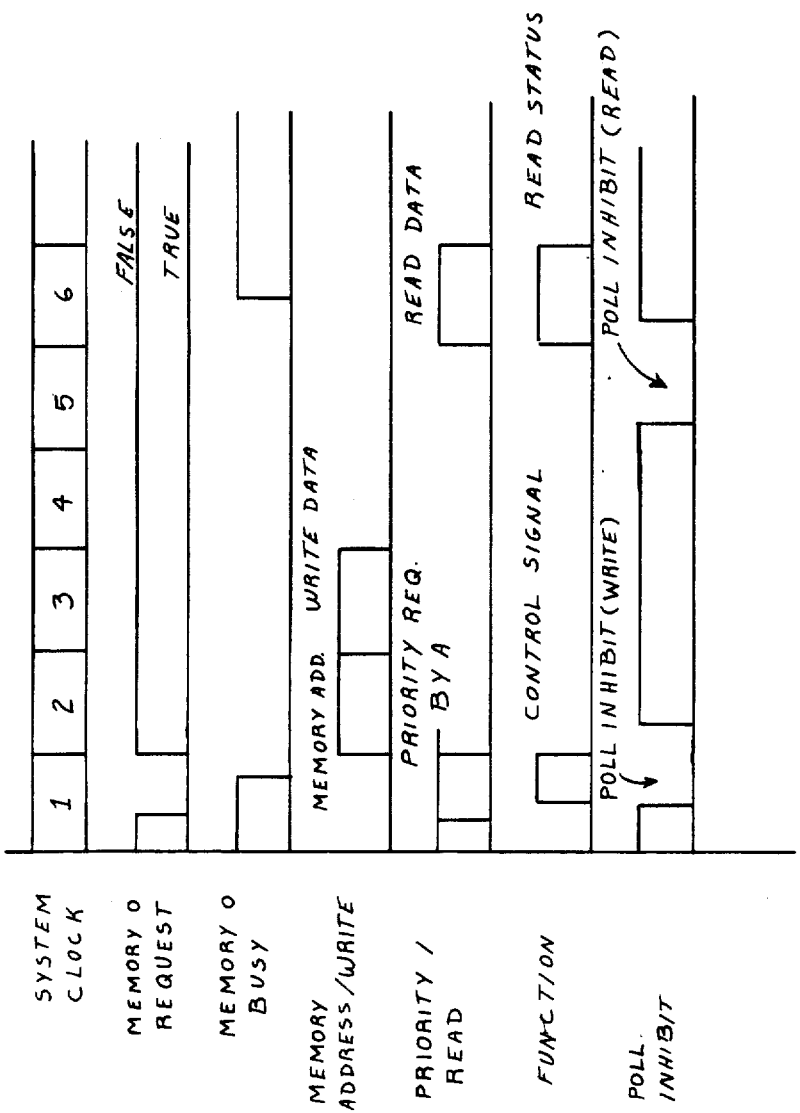
FIG. 5 shows the timing diagram for a processor accessing a common memory module in accordance with the present invention.

The actual components of the processor bus interface 38 and memory interface 40 are best described in conjunction with an operational cycle. FIG. 5 shows a relatively simple operation wherein a single processor 32 gains access to one of the memory modules 34 i.e. memory 0 and reads or writes data. As previously mentioned this operation takes six clock periods. During the first period microprocessor 32 activates the memory request time for memory 0 through the bus request/busy circuit and at the same time it queries the priority bits on bus 60 through the priority sense circuit 66. Each microprocessor is assigned a priority bit on bus 60 as well as a priority order. Thus during the first period, the processor 32 continuously monitors the priority bus and if it senses no other higher priority bits, or that is, if its own priority order is higher than the priority of other processors requesting access to the common bus, then it activates the appropriate bit in priority bus 60 through circuit 64. If the processor looses the priority poll during the first clock period it maintains the request bus engaged.

Also during the first period, the processor sends a function control message (i.e. read or write) on bus 56 through interface timing and control circuit 68. However if the processor looses the poll, the control message is deactivated.

If the processor wins the priority poll in the first period then in the second period the processor releases the memory request for memory 0 and activates the busy line for memory 0 through circuit 64. (Alternately, the busy line for memory 0 may be released at the end of the first period by the processor but maintained activated by the memory module for the remainder of the memory access cycle). The processor also sends a memory address to the memory address line 62 through a memory address register 70.

If processor 32 wants to write data into memory 0 then during the first period a "write" control signal is sent to function bus 56 and the poll inhibit bus 58 is activated during the first clock period. If a "read" operation is required than the control signal during the first period corresponds to a "read" command. For a "read" operation periods 3 and 4 are idle (except for the memory 0 busy line). On the fifth period the poll inhibit line 58 is activated to insure that no other processor will gain access to the priority/read bus 62 and on the sixth clock period data from the memory 0 is sent on bus 60 and is received by processor 32 through read data register 72. Simultaneously, on function bus 56 a "read status" signal is received from the memory through interface timing and control 68 to confirm that data is correctly read from the memory.

During the sixth period, the processor (or the memory module as described above) also releases the memory 0 busy time so that another request may be processed during the seventh period.

Figure 4:
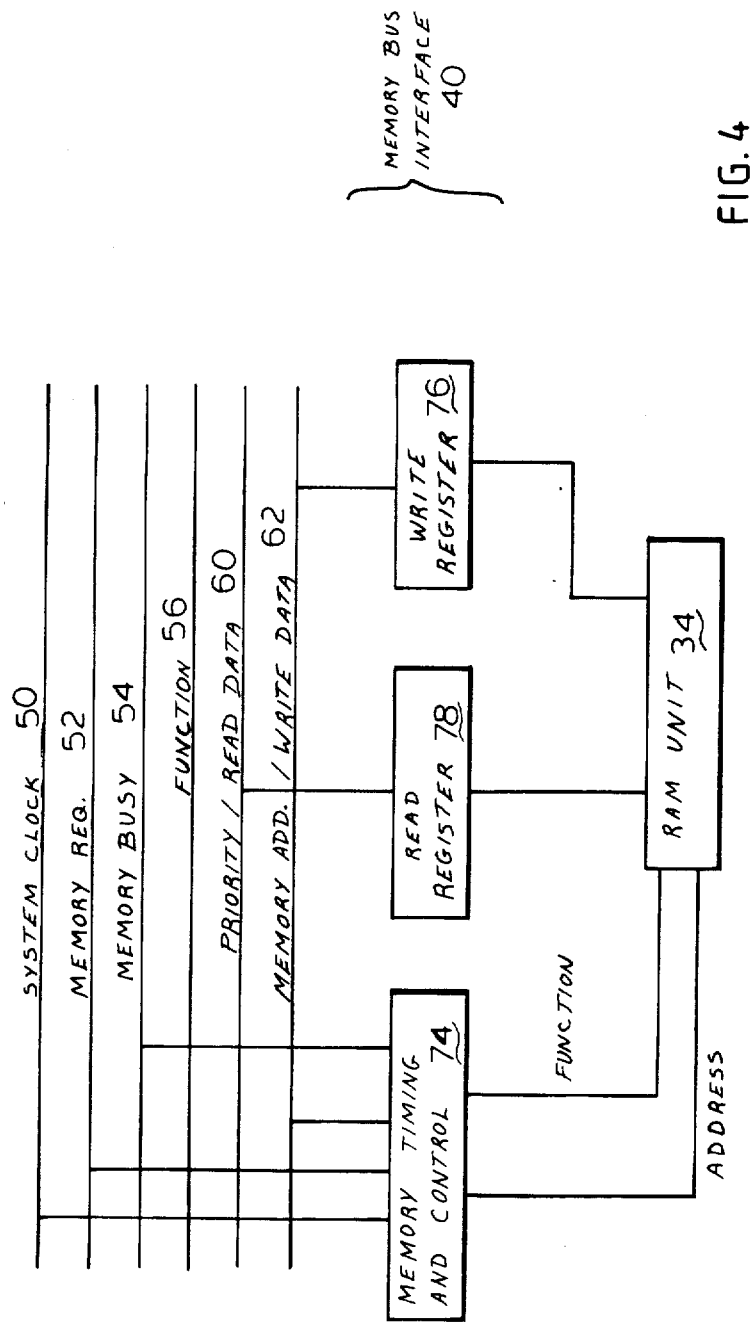
FIG. 4 shows a memory module and its bus interface for the shared memory system of FIG. 1.

As shown in FIG. 4, each memory interface unit 40 comprises a memory timing and control circuit 74. This circuit is enabled by signal from the memory request 52 indicating that the particular memory unit 34 is to participate in the next operational cycle. During the first operational cycle, circuit 74 receives a "read" or "write" command from function bus 56. During the second period the address within the memory at which the operation is to take place, is received from bus 62. During the third period data from bus 62 is written (during a "write" operation) into the memory through write register 74. Finally, during the sixth period, data is read from the memory (during a "read" operation) through read register 78 to bus 60 and simultaneously a "read status" signal is sent to the function bus 56 by control circuit 74.

Figure 6:
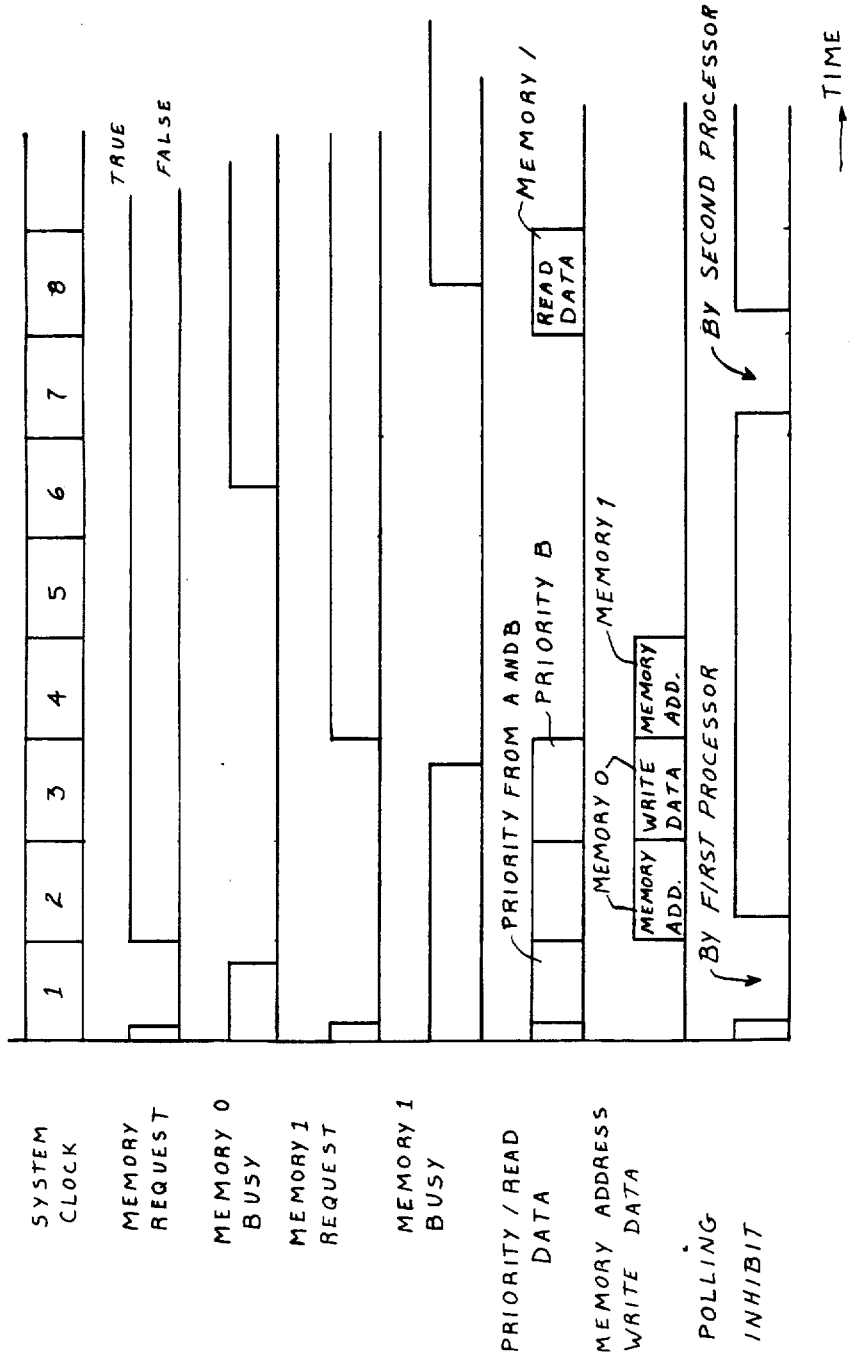
FIG. 6 shows the timing diagram for two processors accessing two common memory modules in accordance with the present invention.

A slightly more complicated occurrence is illustrated in FIG. 6. In this Figure two processors A and B request access to two different memories 0 and 1 respectively during the first clock period, with A desiring a "write" operation and B desiring a "read" operation. Processor A wins the priority poll during the first period and gains access to memory 0. Therefore, memory 0 is busy from the second through the sixth period. During the second period A writes a memory address for memory 0 on bus 62. Since A desires a "write" operation the poll inhibit line is activated during the first period in order to prevent processor B from conducting a priority poll during the second period resulting in a memory address in the third period that would collide with the WRITE data from processor A. During the third period, A writes data on bus 62 while B gets priority and access to memory 1. Memory 1 is busy during the fourth through eighth periods. During the sixth period processor A releases memory 0. During the seventh period B activates the poll inhibit bus and during the eighth period B reads data form bus 60 and releases memory 1.

Figure 7:
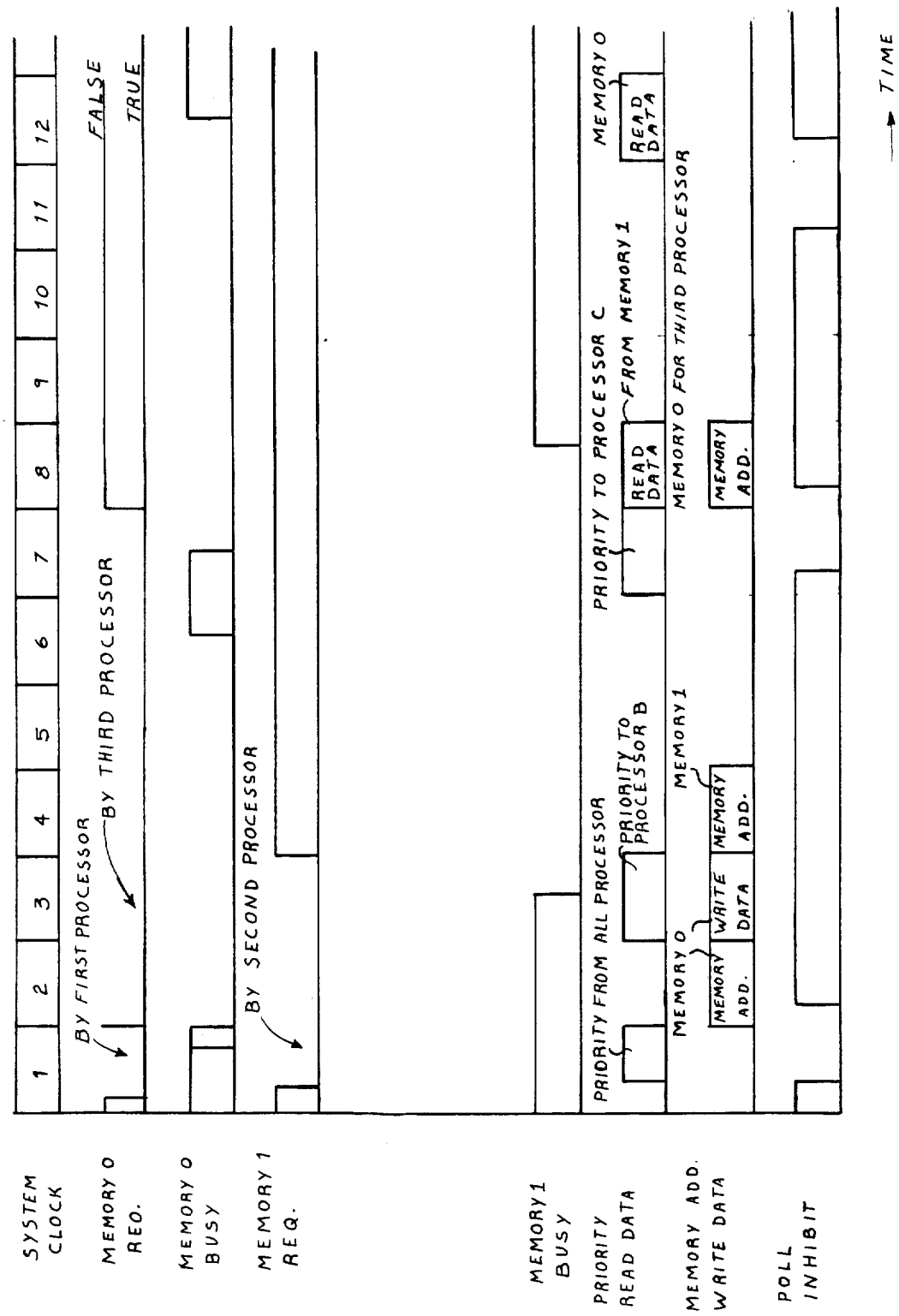
FIG. 7 shows the timing diagram for three processors accessing two common memory modules in accordance with the present invention.

In FIG. 7 processor A wants to gain access to memory 0 to write data, processor B wants to read data from memory 1 and processor C wants to read data from memory 0 simultaneously, with A having the top priority and B having priority over C. A comparison of FIGS. 7 and 6 shows that processor A and B perform identically. Since processor A has priority over C and memory 0 is busy until the seventh period, C gains access only in the seventh period.

Figure 8:
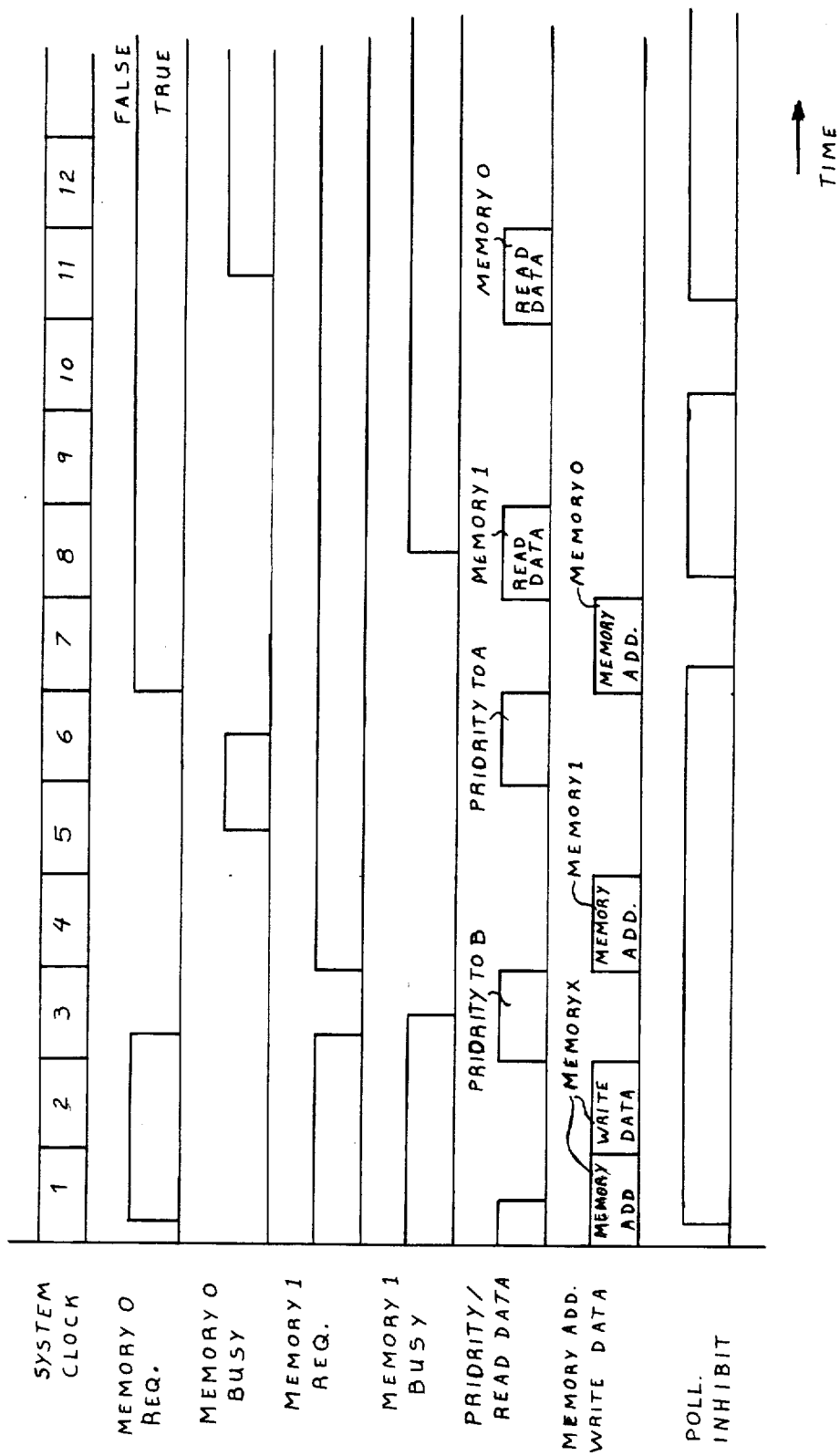
FIG. 8 shows the timing diagram for two processors accessing two common memory modules, one of which modules is initially busy, in accordance to the present invention.

In FIG. 8, processors A and B try to gain access to memories 0 and 1 (as in FIG. 4) except that a previous processor X has already gained access to memory 0 for a WRITE operation. In periods 1 and 2 processor X writes the memory address and data on bus 62 and the poll inhibit bus is activated. Memory 0 remains busy until the sixth period. Meanwhile during the third period processor B gains access to memory 1 even though processor A has a higher priority on the bus. During the fourth period B writes the memory address on bus 62 and during the eighth period it reads the data from bus 60. Processor A finally gains access to memory 0 during the sixth period and gets to read the data during the eleventh period.

As previously mentioned, any processor may interrupt any other processor. For this purpose, the processor interface 38 includes an interprocessor interrupt circuit 80 which is used to send an interrupt command to another processor through a command latch 82 and function bus 56. Incoming interprocessor interrupts are recognized by the priority sense circuit 66 and sent in chronological order through a first-in/first-out register 84 to the interrupt circuit 80 and processor 32 as shown.

It can be seen from the above description that for writing data, once a processor gets access to a memory module, it provides sequentially the memory address and the data and then releases the memory module. For reading data, after the memory address is provided, three clock periods go by before the data is read from the memory to give the memory module time to retrieve the data. Thus high speed memory modules are not required. During these idle periods the processor requesting the data can perform other functions because the exact time when the data becomes available is known before hand. Meanwhile, the common bus can be used by other processors through the interleaving protocol described above.

Obviously, numerous modifications may be made to the system and protocol including various other interleaving schemes described herein without departing from the scope of the invention as defined in the appended claims.

I claim:

1. A method for providing asynchronous processors with inter-processor communication and access to several memory modules over a common bus which includes a first bus and a second bus, comprising:

providing clock pulses on said common bus, each pulse having a period;

asserting a request signal and placing priority signal on said common bus during a first period when any one of said processors performs an operation that requires access to the memory module;

polling the processors during said first period to determine whether the processors request access to said common bus and to determine which one processor has priority;

sending a destination address from said one processor to a destination during a second period, said destination being chosen from said processors and said several memory modules;

performing one of reading input data between said destination and said processor having priority during a reading input data period and writing output data between said processor having priority and said destination during a writing output data period, said reading period being separated from said second period by a plurality of idle periods during which a second processor accesses a second destination on said common bus;

multiplexing priority and reading input data signals on said first bus, and multiplexing address and writing output data signals on said second bus;

generating poll inhibit signals prior to each reading input data signal and prior to each memory address signal preceeding a writing output data operation; and queuing said input data in a first-in-first-out manner for each of said processors when said input data indicates an interprocessor interrupt.

* * * * *